US011548484B2

United States Patent
Karpenko et al.

(10) Patent No.: US 11,548,484 B2
(45) Date of Patent: Jan. 10, 2023

(54) BRAKE PAD RETRACTING DEVICE

(71) Applicant: Ford Global Technologies, LLC, Dearborn, MI (US)

(72) Inventors: Yuri Anatoly Karpenko, Brighton, MI (US); Joshua Howell, Belleville, MI (US); J. Chris Oakwood, West Bloomfield, MI (US); Charles K. Evans, Willis, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 146 days.

(21) Appl. No.: 17/176,735

(22) Filed: Feb. 16, 2021

(65) Prior Publication Data

US 2022/0258702 A1   Aug. 18, 2022

(51) Int. Cl.
| | |
|---|---|
| B60T 1/06 | (2006.01) |
| F16D 55/228 | (2006.01) |
| F16D 65/00 | (2006.01) |
| F16D 65/52 | (2006.01) |
| F16D 65/097 | (2006.01) |
| F16D 55/00 | (2006.01) |
| F16D 127/02 | (2012.01) |

(52) U.S. Cl.
CPC .......... B60T 1/065 (2013.01); F16D 55/228 (2013.01); F16D 65/0006 (2013.01); F16D 65/0068 (2013.01); F16D 65/0087 (2013.01); F16D 65/0979 (2013.01); F16D 65/52 (2013.01); F16D 2055/0016 (2013.01); F16D 2127/02 (2013.01)

(58) Field of Classification Search
CPC ............. B60T 1/065; F16D 55/22; F16D 55/225–228; F16D 65/0006; F16D 65/0087; F16D 65/0972; F16D 65/38
USPC ............ 188/73.36–73.38, 73.44, 73.45
See application file for complete search history.

(56) References Cited

U.S. PATENT DOCUMENTS

| | | | |
|---|---|---|---|
| 4,345,674 A | 8/1982 | Vacval | |
| 4,858,728 A | 8/1989 | Thiel et al. | |
| 9,145,120 B2 | 9/2015 | Burgoon et al. | |
| 9,261,152 B2 | 2/2016 | Gutelius et al. | |
| 10,145,432 B2 | 12/2018 | Previtali et al. | |
| 10,871,197 B2* | 12/2020 | Wilson | F16D 55/22 |
| 11,209,057 B2* | 12/2021 | Rankin | F16D 65/0972 |
| 2007/0227836 A1* | 10/2007 | Kingston | F16D 13/757 |
| | | | 188/73.1 |

(Continued)

FOREIGN PATENT DOCUMENTS

| | | |
|---|---|---|
| KR | 200482761 | 3/2017 |
| WO | 2019197115 | 10/2019 |

*Primary Examiner* — Christopher P Schwartz
(74) *Attorney, Agent, or Firm* — Lorne Forsythe; Hanley, Flight & Zimmerman LLC (57) ABSTRACT

A brake pad retracting device is disclosed. An example vehicle braking system comprising a rotor, and a caliper including a brake pad slidably engaged with a guide pin, and a coil spring through which the guide pin extends, the coil spring having a first end and a second end, the first end having a first inner diameter sized to enable the first end to move freely over a surface of the guide pin, the first end to engage the brake pad to urge the brake pad away from the rotor, and the second end having a second inner diameter sized to frictionally engage the surface of the guide pin, the first inner diameter greater than the second inner diameter.

20 Claims, 3 Drawing Sheets

(56) References Cited

U.S. PATENT DOCUMENTS

2019/0113090 A1 4/2019 Wilson et al.

* cited by examiner

BRAKE PAD RETRACTING DEVICE

FIELD OF THE DISCLOSURE

This disclosure relates generally to vehicle brake systems and, more particularly, to a brake pad retracting device.

BACKGROUND

Known vehicles include a disc brake system to decelerate the vehicle. The disc brake system typically consists of a rotor (or disc) that is attached to an axle, and a caliper containing two brake pads. The brake pads are located on opposing sides of the rotor (or disc) and move freely in the caliper. The brake pads typically include a layer of friction material attached to a steel backplate. A braking action occurs when the brake pads are urged against the rotor under hydraulic pressure, which creates a frictional force that decelerates the vehicle.

SUMMARY

A vehicle braking system comprising a rotor, and a caliper including a brake pad slidably engaged with a guide pin, and a coil spring through which the guide pin extends, the coil spring having a first end and a second end, the first end having a first inner diameter sized to enable the first end to move freely over a surface of the guide pin, the first end to engage the brake pad to urge the brake pad away from the rotor, and the second end having a second inner diameter sized to frictionally engage the surface of the guide pin, the first inner diameter greater than the second inner diameter.

A brake caliper comprising a brake pad slidably engaged with a guide pin, and a coil spring through which the guide pin extends, the coil spring having a first end and a second end, the first end having a first inner diameter sized to enable the first end to move freely over a surface of the guide pin, the first end to engage the brake pad to urge the brake pad away from a rotor, and the second end having a second inner diameter sized to frictionally engage the surface of the guide pin, the first inner diameter greater than the second inner diameter.

A brake pad retracting device comprising a coil spring through which a guide pin extends, the coil spring including a first end to engage a brake pad to urge the brake pad away from a rotor, the first end having a first inner diameter sized to enable the first end to move freely over a surface of the guide pin, and a second end having a second inner diameter sized to frictionally engage the surface of the guide pin, the first inner diameter greater than the second inner diameter.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," "fourth," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

Known vehicles include a disc brake system to decelerate the vehicle. The disc brake system typically consists of a rotor (or disc) that is attached to an axle, and a caliper containing two brake pads. The brake pads are located on opposing sides of the rotor (or disc) and move freely in the caliper. The brake pads typically include a layer of friction material attached to a steel backplate. A braking action occurs when the brake pads are urged against the rotor under hydraulic pressure, which creates a frictional force that decelerates the vehicle. The disc brake system typically includes a steering knuckle that attaches the caliper to the frame of the vehicle and carries the torque.

In some examples, the brake pads may be guided inside the caliper via, for example, a pin or a support bracket. These features help to maintain the pads movement toward the brake rotor while being parallel to its axis of rotation under applied hydraulic pressure during a braking event. When the applied pressure is released after the completion of vehicle deceleration, the brake pads are expected to fully retract from the rotor surfaces assisted by the elastic resilience of the friction material of the brake pads and the dynamic interactions with the uneven rotor surfaces. Under light applied pressures that are often used by drivers to control vehicle speed, brake pads can make only a partial contact with rotor surfaces leading to unstable friction between the brake pads and rotor. Unstable behavior of the rotor/pad friction pair can prevent the full retraction of the brake pads from rotor surfaces due to their tilt, rotation, pivot, or a non-planar movement with respect to the rotor axis of rotation.

Incomplete retraction of the brake pads from the rotor surfaces after the completion of a braking event may result in caliper drag, which produces uneven wear of the brake pads, uneven wear of the rotor, brake pad distortion, reduced life of the brake pads or rotor, and degradation in the fuel economy of the vehicle.

Current solutions for brake pad retracting devices include piston clips to keep the pads away from the rotor in fixed calipers, double sticky insulators on the backplate to keep the pads away from the rotor, and active pad retraction clips for a slider caliper. However, some current solutions for brake pads retracting devices require significant space inside the caliper, which can be costly. Additionally, current solutions do not account for brake pad lining material wear over time, which may not aid in preventing the unwanted movement, tilting, rotation, pivoting, non-planar movement, or a combination thereof of the brake pads after wear from use.

Some current solutions for the brake pad retracting devices include various springs. However, the addition of these one or more springs in current solutions may be subject to inference with moving parts such as the brake rotor or the wheel (e.g., the one or more springs are placed directly over the rotor). Another disadvantage of current brake pad retracting devices is that they typically use non-linear springs to maintain the restoring force values below the threshold when there is wear of the brake pad lining material. The design of such small non-linear springs, in general, is challenging and may require significant design space inside the caliper and the use of the very thin cross sections for the elements of such springs. Additionally, due to the relatively small values of the needed restoring force, the current solutions for retracting devices have small cross sections of the spring elements, which makes the installation of the springs into the caliper and the overall handling cumbersome. Often, the springs can even be bent or broken during the installation process, which degrades performance in the caliper assembly.

Further, while these one or more springs in current solutions may increase a retraction force for the brake pads, the retraction force is often not evenly applied to the brake pads. For example, due to their relatively low bending stiffness or flexibility, the one or more springs may provide a retraction force acting non-parallel to the rotor rotation axis. As a result, the one or more springs may not aid in preventing the unwanted movement, tilting, rotation, pivoting, non-planar movement, or a combination thereof of the brake pads.

Examples disclosed herein deliver the complete retraction of the brake pads from the rotor surfaces after the completion of a braking event by providing a dual function brake pad retracting device, which is installed at each top corner of the brake pads inside the brake caliper. The brake pad retracting device includes of a spring element having a first spring end that functions to hold the pads away from the rotor surfaces and a second spring end to function as a dry friction end support to compensate for wear of the pad lining material over the service life of the brake pads. In examples disclosed herein, the brake pad retracting device can be supported in the caliper with the use of the pad guide pins (e.g., the guide pins that are already available in the fixed calipers).

In examples disclosed herein, the spring element of the retracting device can be in the shape of a coil spring, and the first spring end may have a diameter that is slightly larger than the guide pin diameter to allow for the unconstrained sliding of the first end of the coil spring over the pin surface. The dry friction end support of the pad retracting device may protrude from the first spring end of the spring element as a coil spring with a smaller diameter. In example disclosed herein, the diameter of the smaller coil spring may be slightly smaller than the diameter of the guide pin to create a static friction force between the smaller diameter end of the coil spring (acting as a dry friction end support) and the guide pin surface.

In examples disclosed herein, the static friction force of the dry friction end support provides resistance to the restoring force of the first end of the spring element that urges the brake pads away from the rotor surfaces. In examples where there is wear of the brake pad lining material over the service life of the brake, the compression of the first end of the spring element increases when the hydraulic pressure is applied to the brake pads due to increased travel of the brake pads. When the value of the spring restoring force from the first end of the spring element increases to exceed the static friction force at the dry friction end support, the dry friction end support slips or slides over the guide pin surface toward the rotor surface to reduce the compression of the first end of the spring element, thereby reducing the restoring force applied to the brake pads. In such an example, the slipping of the dry friction end support of the spring element helps to ensure that the restoring force applied by the first end of the spring element does not increase above a threshold for the spring restoring force in the brake pad retracting devices. In examples disclosed herein, the threshold for the spring restoring force ensures that clearance between the brake pad and rotor surfaces during the "off-brake" conditions (e.g., when the brake is not engaged by a user of the vehicle) is not excessive. In some examples, excessive clearance between the brake pads and rotor surfaces during the "off-brake" conditions is known to cause poor responsiveness or brake feel of the brake system to the driver/user inputs.

Examples disclosed herein address the deficiencies of current solutions by proposing a dual function spring element for use as a brake pad retracting device. The first end of the spring element provides a restoring force to the brake pads to urge the brake pads away from the rotor surfaces, and the second end (the dry friction end support) of the spring element provides a means for the automatic, self-adjustment of the retracting device to allow for the brake pad lining material wear over the service life of the brake pads. Additionally, examples disclosed herein can be mounted over pad guide pins that are already available in the fixed calipers, which helps to ensure that the coil springs of the device are protected from damage during the caliper assembly and service by the guide pins and that they are always parallel to the rotor rotation axis.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 1:
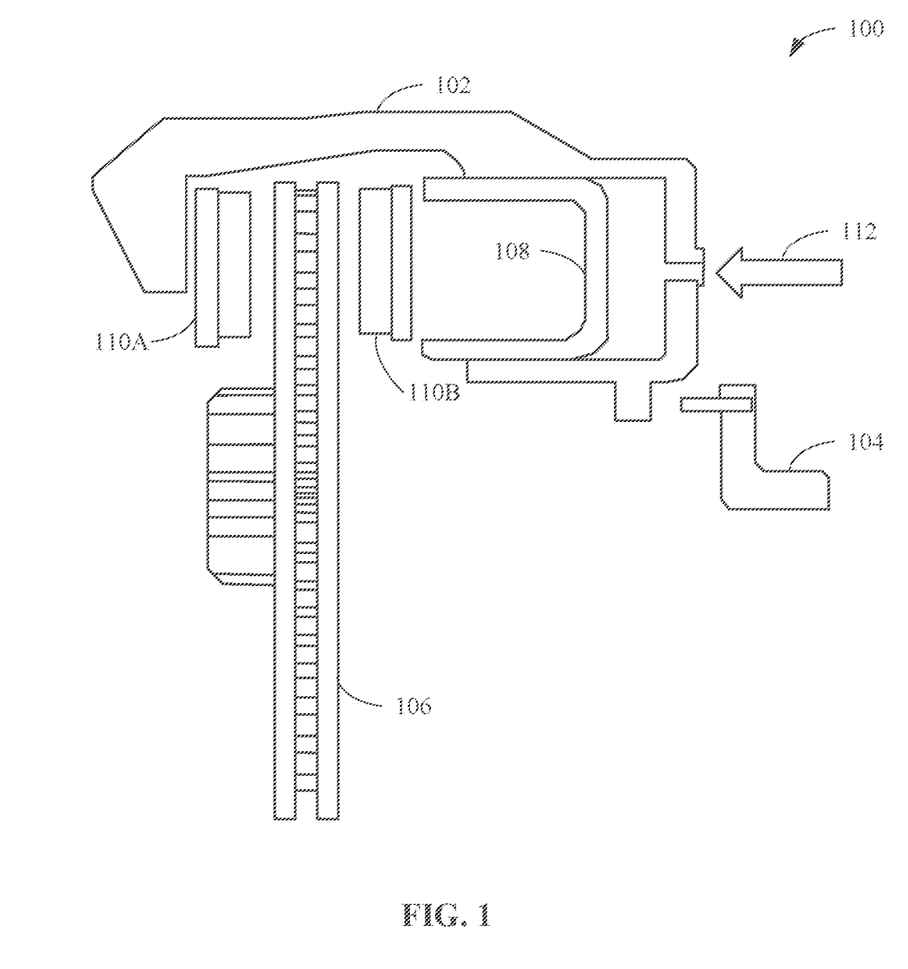
FIG. 1 illustrates an example disc brake system for a vehicle.

FIG. 1 illustrates an example disc brake system 100 for a vehicle. The disc brake system 100 includes an example caliper 102 coupled to an example chassis 104, an example rotor 106, an example piston 108, example brake pads 110A, 110B, and example fluid pressure 112. In the illustrated example of FIG. 1, the caliper 102 is located in the vehicle near the chassis 104 adjacent the wheels of the vehicle. The caliper 102 partially surrounds the rotor 106. In the illustrated example, the rotor 106 is coupled to an axle of a wheel and to the caliper 102. The caliper 102 houses the brake pads 110A, 110B and the piston 108. In the illustrated example, the brake pads 110A, 110B are located on opposing sides of the rotor 106 and move freely in the caliper 102. In some examples, the brake pads 110A, 110B include a layer of friction material attached to a steel backplate.

In the illustrated example of FIG. 1, the disc brake system 100 decelerates the vehicle in response to a user engagement with the disc brake system 100. The fluid pressure 112 illustrates hydraulic pressure applied to the caliper 102 in response to the user engagement of the disc brake system 100. In the illustrated example, a braking action from user engagement occurs when the brake pads 110A, 110B are pushed by the caliper 102 against the rotor 106 under the fluid pressure 112, which creates a frictional force that decelerates the vehicle. In some examples, the brake pads 110A, 110B may be guided inside the caliper along one or more abutment features, such as a pin or a support bracket. These features help to maintain the movement of the brake pads 110A, 110B toward the rotor 106 parallel to the axis of rotation under the applied fluid pressure 112. When the fluid pressure 112 is released after the completion of vehicle deceleration, the brake pads 110A, 110B are expected to fully retract from the rotor 106.

In the illustrated example, a light braking event occurs when the fluid pressure 112 has a small value based on the applied user engagement, which may occur to control vehicle speed. In such examples, the brake pads 110A, 110B may make only partial contact with rotor 106 surfaces, which leads to unstable friction between the brake pads 110A, 110B and the rotor 106. In the illustrated example of FIG. 1, unstable behavior of the friction between the brake pads 110A, 110B and the rotor 106 can prevent the full retraction of the brake pads 110A, 110B from the surfaces of the rotor 106 due to tilt, rotation, pivot, or a non-planar movement with respect to the rotor axis of rotation of the brake pads 110A, 110B. In such examples, the incomplete retraction of the brake pads 110A, 110B from the surfaces of the rotor 106 after the completion of a braking event may result in caliper drag, which produces uneven wear of the brake pads 110A, 110B, uneven wear of the rotor 106, distortion of the brake pads 110A, 110B, reduced life of the brake pads 110A, 110B or the rotor 106, and the degradation of the fuel economy of the vehicle. Examples disclosed herein illustrate a brake pad retracting device to fully retract the brake pads 110A, 110B from the rotor 106 after braking events while compensating for brake pad lining wear during the service life of the brake pads 110A, 110B.

Figure 2:
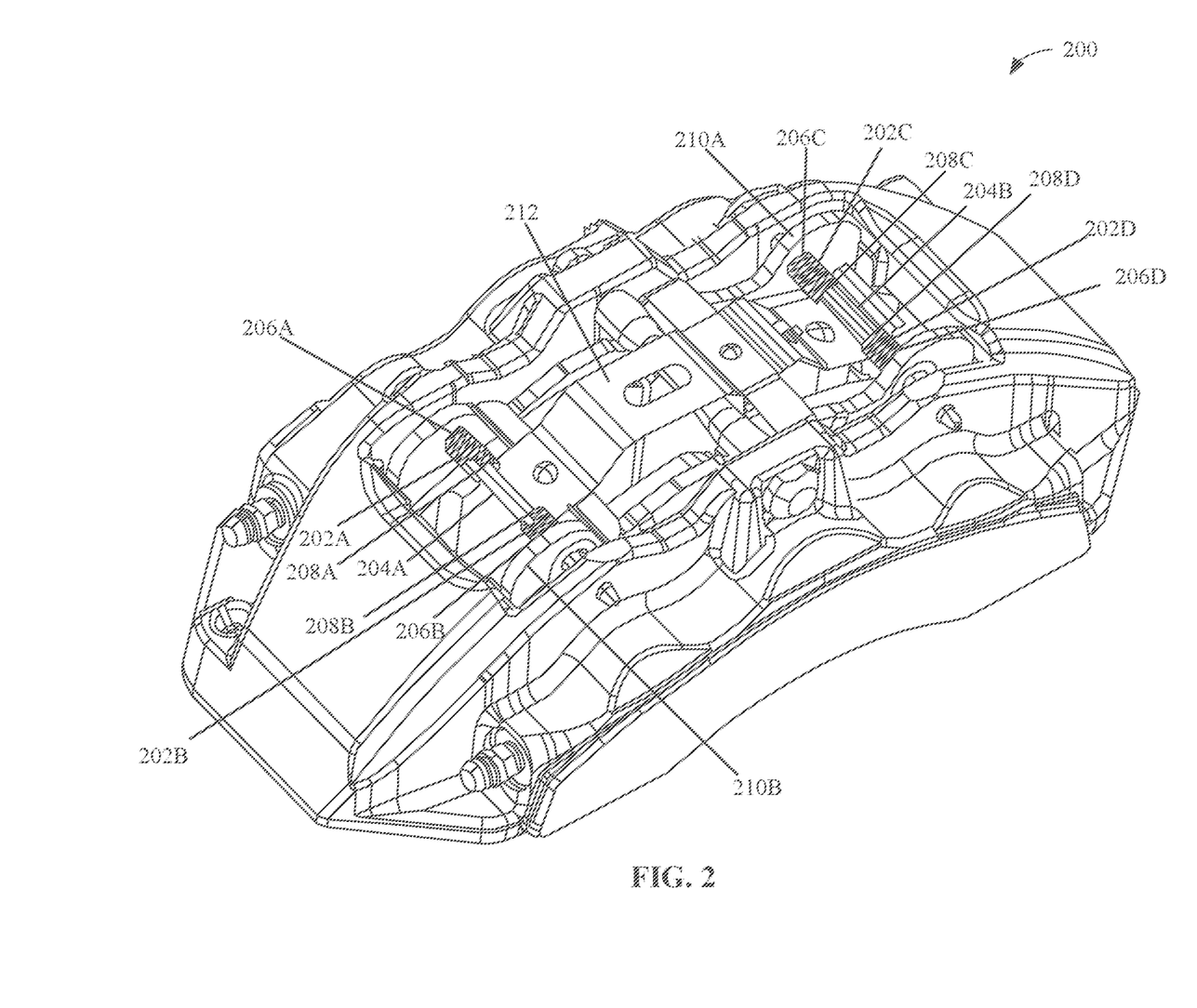
FIG. 2 illustrates an example fixed caliper including example brake pad retracting devices in accordance with the teachings of this disclosure.

FIG. 2 illustrates an example fixed caliper 200 including example brake pad retracting devices 202A, 202B, 202C, 202D in accordance with the teachings of this disclosure. The fixed caliper 200 includes the brake pad retracting devices 202A, 202B, 202C, 202D, example guide pins 204A, 204B, example first ends 206A, 206B, 206C, 206D and example second ends 208A, 208B, 208C, 208D of the respective brake pad retracting devices 202A-D, 212.

In the illustrated example of FIG. 2, the brake pad retracting devices 202A, 202B, 202C, 202D are depicted as a coil spring that fully retracts the brake pads (e.g., the brake pads 110A, 110B of FIG. 1) from the rotor (e.g., the rotor 106 of FIG. 1) after braking events while compensating for brake pad lining wear during the service life of the brake pads. The brake pad retracting devices 202A, 202B, 202C, 202D are mounted over the guide pins 204A, 204B that are available in the fixed caliper 200. In the illustrated example, the guide pin 204A extends through the brake pad retracting devices 202A, 202B and the guide pin 204B extends through the brake pad retracting devices 202C, 202D. In the illustrated example, the brake pad retracting device 202A and the brake pad retracting device 202B are located adjacent or on opposite ends of the guide pin 204A, and the brake pad retracting device 202C and the brake pad retracting device 202D are located adjacent or on opposite ends of the guide pin 204B. In some examples, the brake pad retracting devices 202A, 202B, 202C, 202D are mounted over the guide pins 204A, 204B to ensure that the brake pad retracting devices 202A, 202B, 202C, 202D are protected from damage during the fixed caliper 200 assembly and service and that the brake pad retracting devices 202A, 202B, 202C, 202D are always parallel to the rotor rotational axis. In the illustrated example, the guide pins 204A, 204B are slidably engaged with the brake pads.

In the illustrated example of FIG. 2, the brake pad retracting devices 202A, 202B, 202C, 202D include the first ends 206A, 206B, 206C, 206D and the second ends 208A, 208B, 208C, 208D. The first ends 206A, 206B, 206C, 206D are sized to enable the first ends 206A, 206B, 206C, 206D to move freely over the surfaces of the guide pins 204A, 204B. The first ends 206A, 206B, 206C, 206D engage the brake pads (e.g., the brake pads 110A, 110B) via the brake pad backplates 210A, 210B to urge the brake pads away from the rotor (e.g., the rotor 106). In the illustrated example, the first ends 206A, 206C are operatively coupled to the brake pad backplate 210A, and the first ends 206B, 206D are operatively coupled to the brake pad backplate 210B. More specifically, the second ends 208A, 208B, 208C, 208D are sized to frictionally engage the surfaces of the guide pins 204A, 204B. The second ends 208A, 208B, 208C, 208D apply a frictional engagement to provide resistance to a force applied by the first ends 206A, 206B, 206C, 206D. In the illustrated example, the second ends 208A, 208B, 208C, 208D are coupled to (e.g., pinched under) the anti-rattle clip 212 of the fixed caliper 200. The example brake pad retracting device 202A is described in further detail below in connection with FIG. 3.

Figure 3:
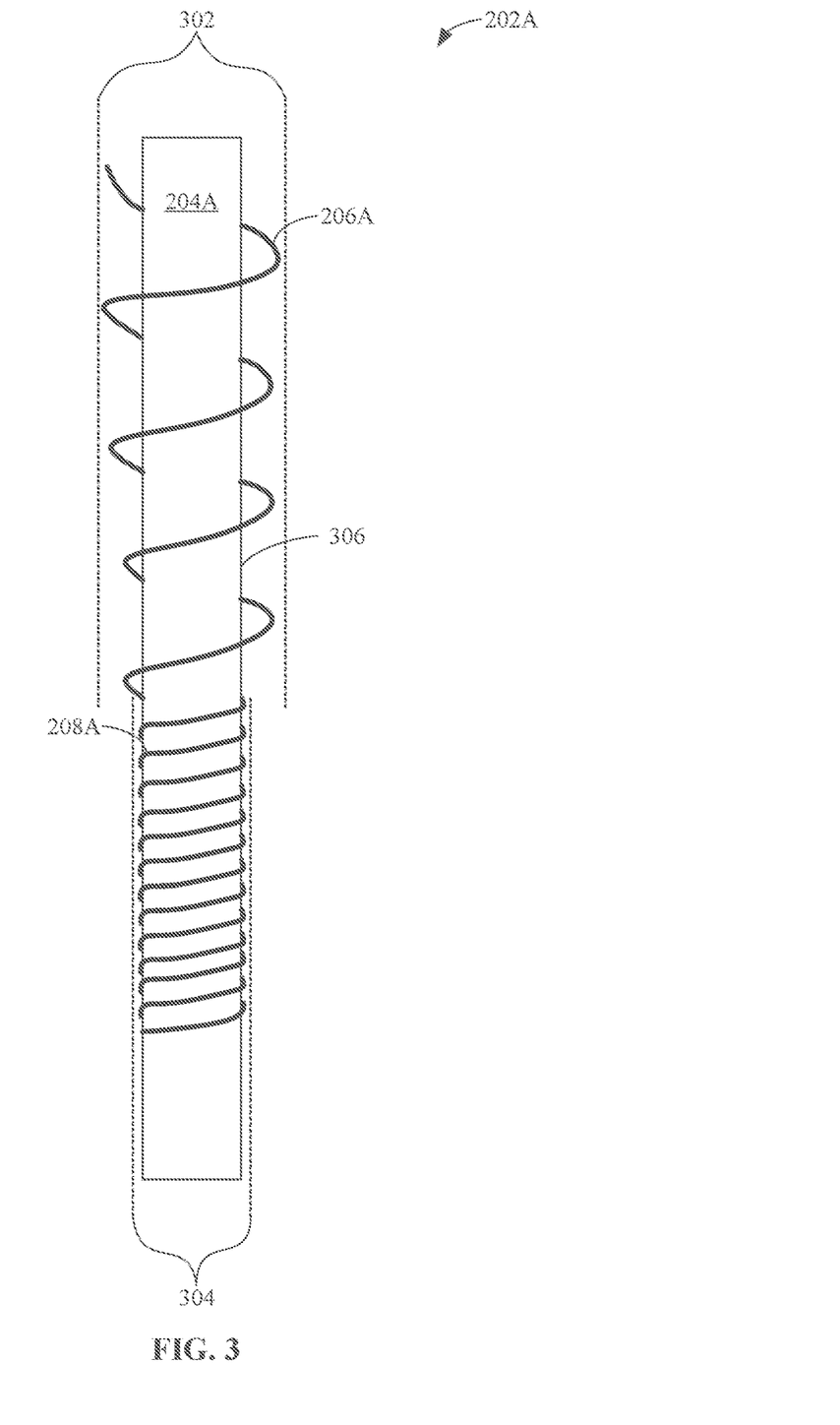
FIG. 3 is an enlarged view of one of the example brake pad retracting devices of FIG. 2.

FIG. 3 depicts enlarged view of the example brake pad retracting device 202A of FIG. 2. The following description of the brake pad retracting device 202A also pertains to the other brake pad retracting devices 202B-D. The brake pad retracting device 202A of FIG. 3 includes the guide pin 204A, the first end 206A, the second end 208A, an example first diameter 302, and an example second diameter 304. In the illustrated example of FIG. 3, the brake pad retracting device 202A is a coil spring with two ends, the first end 206A and the second end 208A. The first end 206A engages a brake pad (e.g., the brake pads 110A, 110B of FIG. 1) to urge the brake pad away from a rotor (e.g., the rotor 106 of FIG. 1). The first end 206A has the first diameter 302 that is sized to enable the first end 206A to move freely over a surface 306 of the guide pin 204A. In some examples, the first diameter 302 is larger (e.g., by 5% to 10%) than the diameter of the guide pin 204A to allow for the unconstrained moving (sliding) of the first end 206A over the surface 306 of the guide pin 204A. The second end 208A applies a frictional engagement to provide resistance to the force that urges the brake pad away from the rotor applied by the first end 206A. The second end 208A has the second diameter 304 that is sized to frictionally engage the surface 306 of the guide pin 204A. The second diameter 304 is smaller (e.g., by 5% to 10%) than the diameter of the guide pin 204A to allow for the creation of a static friction force between the second end 208A (acting as a dry friction end support) and the surface 306 of the guide pin 204A. In the illustrated example, the first diameter 302 is greater than the second diameter 304.

In the illustrated example of FIG. 3, the first end 206A and the second end 208A of the brake pad retracting device 202A deliver complete retraction of the brake pads (e.g., the brake pads 110A, 110B) from the rotor (e.g., the rotor 106) surfaces after the completion of a braking event. The first end 206A acts as a spring element to urge the brake pads away from the rotor surfaces, and the second end 208A acts as a dry friction end support to allow for brake pad lining material wear over the service life of the brake pads. In the illustrated example, the second end 208A applies a static friction force to the guide pin 204A to provide resistance to the force of the first end 206A that pushes the brake pads away from the rotor surfaces.

In examples where there is wear of the lining material of the brake pads over the service life of the brakes, the compression of the first end 206A increases when hydraulic pressure (e.g., the fluid pressure 112 of FIG. 1) is applied to the brake pads. In such examples, the force of the first end 206A may exceed the static friction force from the second end 208A, which causes the second end 208A to slip or move along the surface of the guide pin 204A toward the surface of the rotor, thereby reducing the compression of the first end 206A. In the illustrated example, the second end 208A moves (slides) against the surface of the guide pin 204A towards the rotor to reduce the compression of the first end 206A and ensure that the force of the first end 206A does not exceed a threshold (e.g., 30 N). In some examples, the threshold for the force of the first end 206A ensures that clearance between the brake pad and rotor surfaces during off-brake conditions is not excessive. In some examples, excessive clearance between the brake pads and rotor surfaces during the off-brake conditions causes the poor responsiveness of the brake system to user (driver) inputs.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

From the foregoing, it will be appreciated that example methods, apparatus and articles of manufacture have been disclosed for a brake pad retracting device with a dry friction end support and a spring element. The example methods, apparatus and articles of manufacture improve the retraction of brake pads from the surfaces of the rotor while automatically compensating for wear of the lining of the brake pads during the service life of the brakes. The example methods, apparatus and articles of manufacture include a dual function spring element for the brake pad retracting device, where a first end of the spring element provides a restoring force to the brake pads to keep them away from the rotor surfaces, and the second end of the spring element provides a means for the self-adjustment of the retracting device to compensate for the brake pad lining material wear over the service life of the brake pads. Additionally, the example methods, apparatus and articles of manufacture can be mounted over existing pad guide pins that are commonly available in fixed calipers, which reduces costs and ensures that the lightweight coil springs of the device are protected from damage during the caliper assembly and service by the guide pins and that they are always parallel to the rotor rotation axis.

Example methods, apparatus, systems, and articles of manufacture of brake pad retracting device are disclosed herein. Further examples and combinations thereof include the following:

Example 1 includes a vehicle braking system comprising a rotor, and a caliper including a brake pad slidably engaged with a guide pin, and a coil spring through which the guide pin extends, the coil spring having a first end and a second end, the first end having a first inner diameter sized to enable the first end to move freely over a surface of the guide pin, the first end to engage the brake pad to urge the brake pad away from the rotor, and the second end having a second inner diameter sized to frictionally engage the surface of the guide pin, the first inner diameter greater than the second inner diameter.

Example 2 includes the vehicle braking system of example 1, wherein the first end of the coil spring is coupled to a backplate of the brake pad.

Example 3 includes the vehicle braking system of example 1, wherein the second end of the coil spring is coupled to an anti-rattle clip of the caliper.

Example 4 includes the vehicle braking system of example 1, wherein the frictional engagement between the second end and the surface of the guide pin is to prevent the second end from moving along the guide pin while a force applied by the first end to urge the brake pad away from the rotor does not exceed a threshold.

Example 5 includes the vehicle braking system of example 4, wherein, in response to the force applied by first end exceeding the threshold, the second end moves over the surface of the guide pin towards the rotor to adjust a clearance between the brake pad and the rotor.

Example 6 includes the vehicle braking system of example 1, wherein the coil spring is a first coil spring, and the caliper further includes a second coil spring through which the guide pin extends, the first coil spring and second coil spring located on opposite ends of the guide pin, the second coil spring having a third end and a fourth end, the third end having the first inner diameter, and the fourth end having the second inner diameter.

Example 7 includes the vehicle braking system of example 6, wherein the third end is to engage a second brake pad to urge the second brake pad away from the rotor, and the fourth end is to apply a frictional engagement to provide resistance to a force applied by the third end to urge the second brake pad away from the rotor.

Example 8 includes a brake caliper comprising a brake pad slidably engaged with a guide pin, and a coil spring through which the guide pin extends, the coil spring having a first end and a second end, the first end having a first inner diameter sized to enable the first end to move freely over a surface of the guide pin, the first end to engage the brake pad to urge the brake pad away from a rotor, and the second end having a second inner diameter sized to frictionally engage the surface of the guide pin, the first inner diameter greater than the second inner diameter.

Example 9 includes the brake caliper of example 8, wherein the first end of the coil spring is coupled to a backplate of the brake pad.

Example 10 includes the brake caliper of example 8, wherein the second end of the coil spring is coupled to an anti-rattle clip of the brake caliper.

Example 11 includes the brake caliper of example 8, wherein the second end is to apply a frictional engagement to provide resistance to a force applied by the first end to urge the brake pad away from the rotor.

Example 12 includes the brake caliper of example 11, wherein, in response to the force applied by first end exceeding a threshold, the second end moves over the surface of the guide pin towards the rotor to reduce a compression of the first end.

Example 13 includes the brake caliper of example 12, wherein the second end reduces the compression of the first end to reduce a clearance between the brake pad and the rotor.

Example 14 includes the brake caliper of example 8, wherein the coil spring is a first coil spring, and the brake caliper further includes a second coil spring through which the guide pin extends, the first coil spring and second coil spring located on opposite ends of the guide pin, the second coil spring having a third end and a fourth end, the third end having the first inner diameter, and the fourth end having the second inner diameter.

Example 15 includes a brake pad retracting device comprising a coil spring through which a guide pin extends, the coil spring including a first end to engage a brake pad to urge the brake pad away from a rotor, the first end having a first inner diameter sized to enable the first end to move freely over a surface of the guide pin, and a second end having a second inner diameter sized to frictionally engage the surface of the guide pin, the first inner diameter greater than the second inner diameter.

Example 16 includes the brake pad retracting device of example 15, wherein the first end of the coil spring is coupled to a backplate of the brake pad.

Example 17 includes the brake pad retracting device of example 15, wherein the second end of the coil spring is coupled to an anti-rattle clip of a caliper.

Example 18 includes the brake pad retracting device of example 15, wherein the second end is to apply a frictional engagement to provide resistance to a force applied by the first end to urge the brake pad away from the rotor.

Example 19 includes the brake pad retracting device of example 18, wherein, in response to the force applied by first end exceeding a threshold, the second end moves over the surface of the guide pin towards the rotor to reduce a compression of the first end.

Example 20 includes the brake pad retracting device of example 19, wherein the second end reduces the compression of the first end to reduce a clearance between the brake pad and the rotor.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A vehicle braking system comprising:
a rotor; and
a caliper including:
    a brake pad slidably engaged with a guide pin; and
    a coil spring through which the guide pin extends, the coil spring having a first end and a second end, the first end having a first inner diameter sized to enable the first end to move freely over a surface of the guide pin, the first end to engage the brake pad to urge the brake pad away from the rotor, and the second end having a second inner diameter sized to frictionally engage the surface of the guide pin, the first inner diameter greater than the second inner diameter.

2. The vehicle braking system of claim 1, wherein the first end of the coil spring is coupled to a backplate of the brake pad.

3. The vehicle braking system of claim 1, wherein the second end of the coil spring is coupled to an anti-rattle clip of the caliper.

4. The vehicle braking system of claim 1, wherein the frictional engagement between the second end and the surface of the guide pin is to prevent the second end from moving along the guide pin while a force applied by the first end to urge the brake pad away from the rotor does not exceed a threshold.

5. The vehicle braking system of claim 4, wherein, in response to the force applied by first end exceeding the threshold, the second end moves over the surface of the guide pin towards the rotor to adjust a clearance between the brake pad and the rotor.

6. The vehicle braking system of claim 1, wherein the coil spring is a first coil spring, and the caliper further includes a second coil spring through which the guide pin extends, the first coil spring and second coil spring located on opposite ends of the guide pin, the second coil spring having a third end and a fourth end, the third end having the first inner diameter, and the fourth end having the second inner diameter.

7. The vehicle braking system of claim 6, wherein the third end is to engage a second brake pad to urge the second brake pad away from the rotor, and the fourth end is to apply a frictional engagement to provide resistance to a force applied by the third end to urge the second brake pad away from the rotor.

8. A brake caliper comprising:
a brake pad slidably engaged with a guide pin; and
a coil spring through which the guide pin extends, the coil spring having a first end and a second end, the first end having a first inner diameter sized to enable the first end to move freely over a surface of the guide pin, the first end to engage the brake pad to urge the brake pad away from a rotor, and the second end having a second inner diameter sized to frictionally engage the surface of the guide pin, the first inner diameter greater than the second inner diameter.

9. The brake caliper of claim 8, wherein the first end of the coil spring is coupled to a backplate of the brake pad.

10. The brake caliper of claim 8, wherein the second end of the coil spring is coupled to an anti-rattle clip of the brake caliper.

11. The brake caliper of claim 8, wherein the second end is to apply a frictional engagement to provide resistance to a force applied by the first end to urge the brake pad away from the rotor.

12. The brake caliper of claim 11, wherein, in response to the force applied by first end exceeding a threshold, the second end moves over the surface of the guide pin towards the rotor to reduce a compression of the first end.

13. The brake caliper of claim 12, wherein the second end reduces the compression of the first end to reduce a clearance between the brake pad and the rotor.

14. The brake caliper of claim 8, wherein the coil spring is a first coil spring, and the brake caliper further includes a second coil spring through which the guide pin extends, the first coil spring and second coil spring located on opposite ends of the guide pin, the second coil spring having a third end and a fourth end, the third end having the first inner diameter, and the fourth end having the second inner diameter.

15. A brake pad retracting device comprising:
a coil spring through which a guide pin extends, the coil spring including:
a first end to engage a brake pad to urge the brake pad away from a rotor, the first end having a first inner diameter sized to enable the first end to move freely over a surface of the guide pin; and
a second end having a second inner diameter sized to frictionally engage the surface of the guide pin, the first inner diameter greater than the second inner diameter.

16. The brake pad retracting device of claim 15, wherein the first end of the coil spring is coupled to a backplate of the brake pad.

17. The brake pad retracting device of claim 15, wherein the second end of the coil spring is coupled to an anti-rattle clip of a caliper.

18. The brake pad retracting device of claim 15, wherein the second end is to apply a frictional engagement to provide resistance to a force applied by the first end to urge the brake pad away from the rotor.

19. The brake pad retracting device of claim 18, wherein, in response to the force applied by first end exceeding a threshold, the second end moves over the surface of the guide pin towards the rotor to reduce a compression of the first end.

20. The brake pad retracting device of claim 19, wherein the second end reduces the compression of the first end to reduce a clearance between the brake pad and the rotor.

* * * * *